Figure 13:
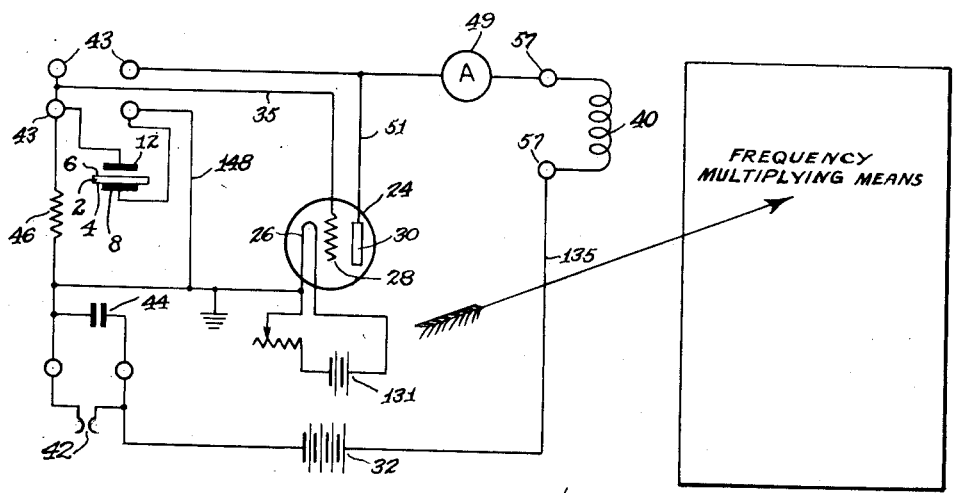

Oct. 18, 1938.     G. W. PIERCE     2,133,643
ELECTRICAL SYSTEM AND APPARATUS
Filed March 29, 1925     4 Sheets-Sheet 1
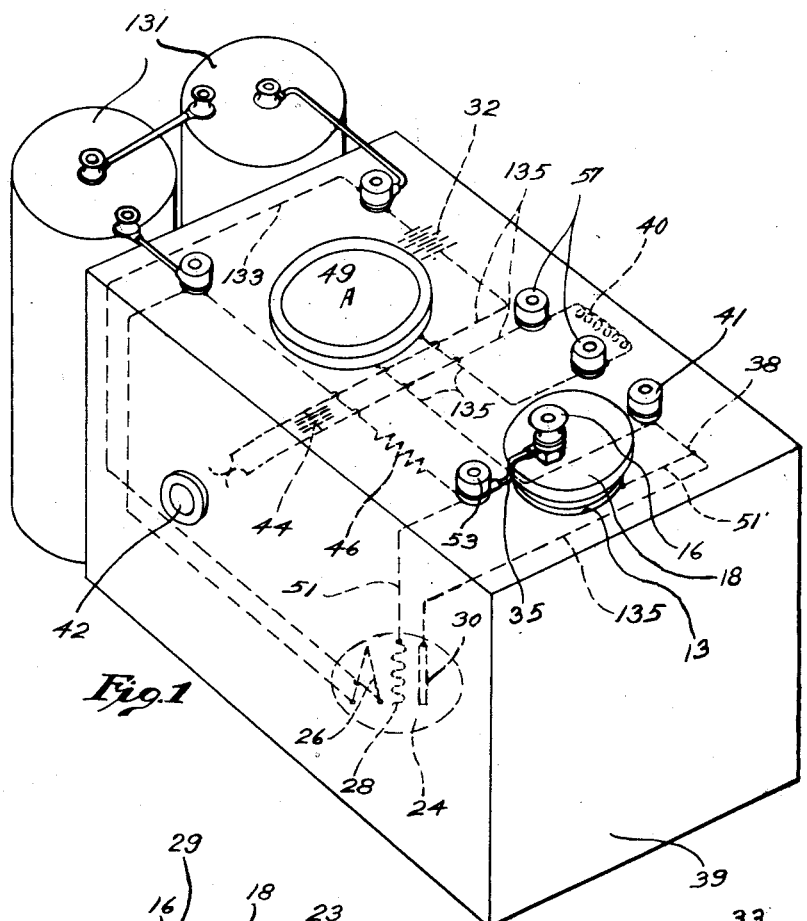
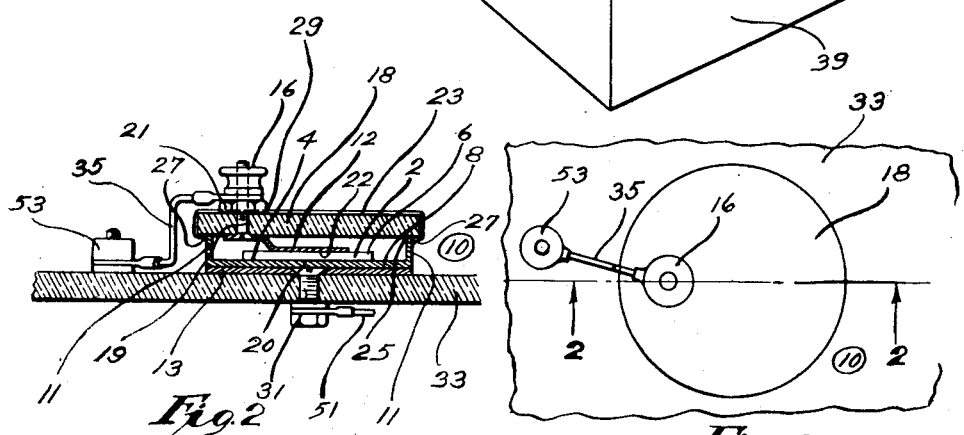
Inventor
George W. Pierce
By David Rines
Attorney Oct. 18, 1938.     G. W. PIERCE     2,133,643
ELECTRICAL SYSTEM AND APPARATUS
Filed March 29, 1926     4 Sheets-Sheet 2
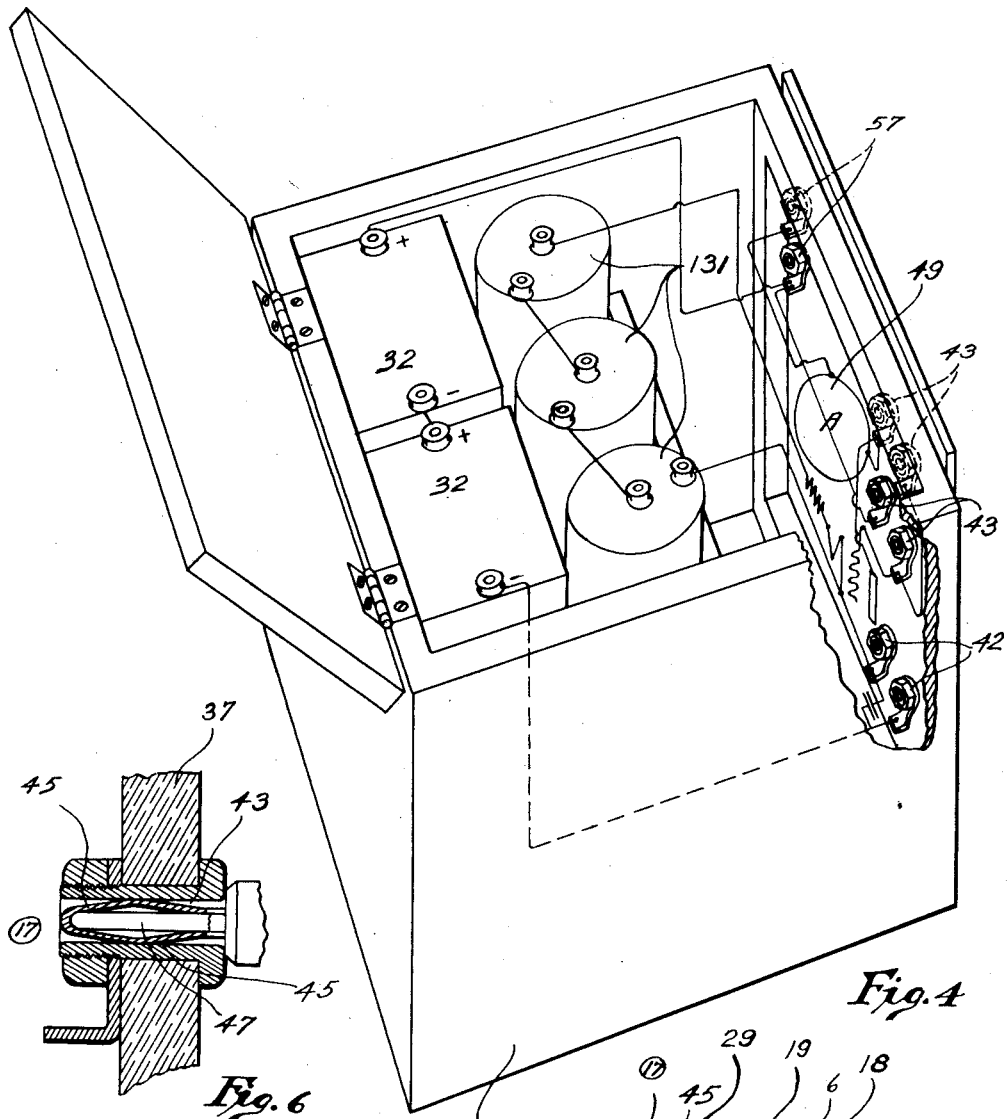
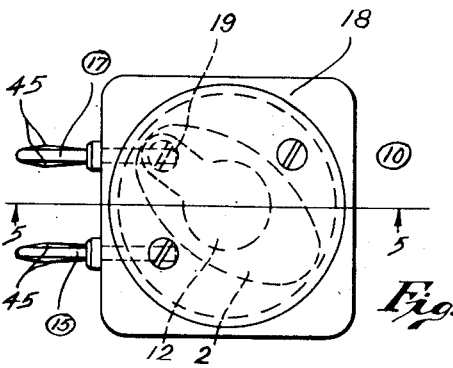
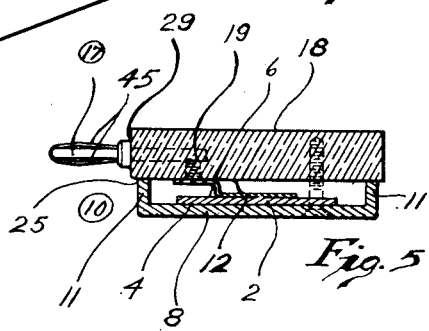
Inventor
George W. Pierce
By David Rines
Attorney Oct. 18, 1938.   G. W. PIERCE   2,133,643
ELECTRICAL SYSTEM AND APPARATUS
Filed March 29, 1926   4 Sheets-Sheet 3
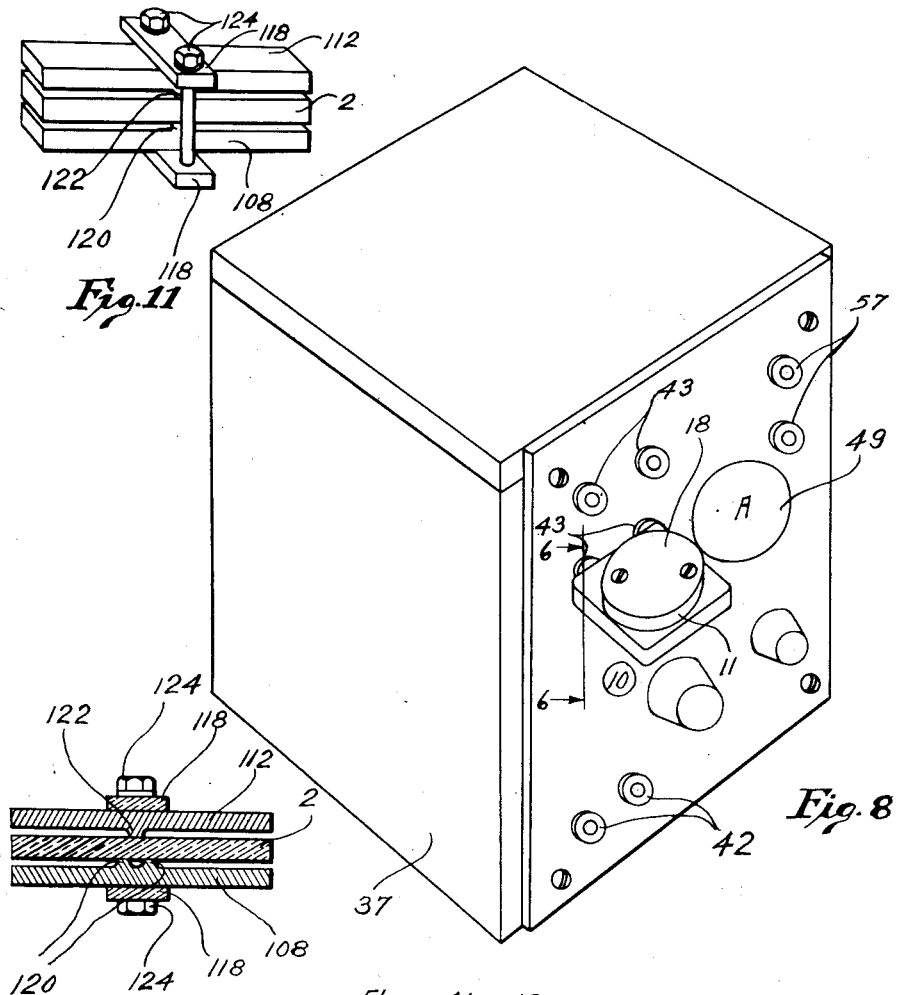
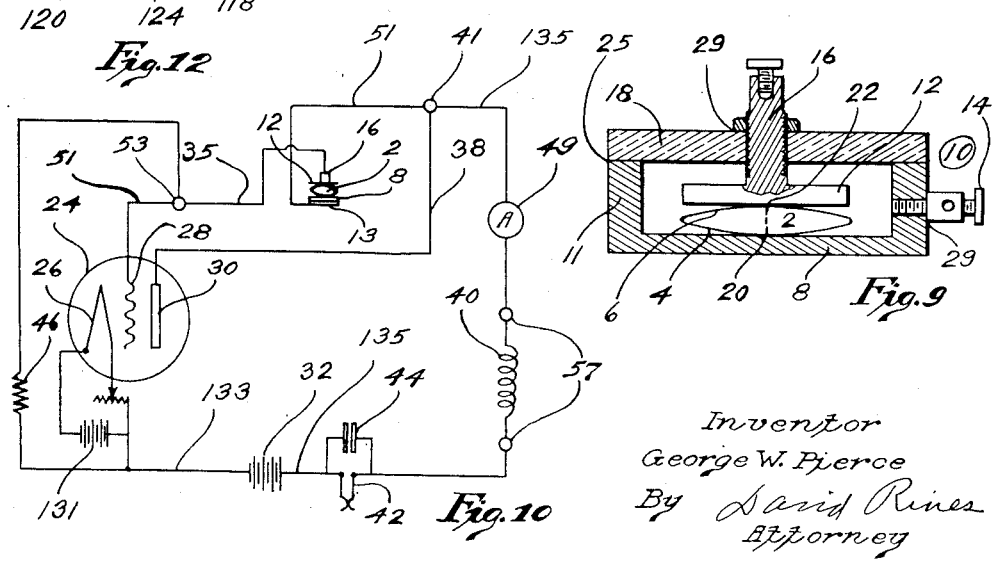
Inventor
George W. Pierce
By David Rines
Attorney Oct. 18, 1938.          G. W. PIERCE          2,133,643
ELECTRICAL SYSTEM AND APPARATUS
Filed March 29, 1926          4 Sheets-Sheet 4

CONSTANT TEMPERATURE BATH

Inventor
George W. Pierce
by David Rines
Attorney

Patented Oct. 18, 1938

2,133,643

UNITED STATES PATENT OFFICE 2,133,643

ELECTRICAL SYSTEM AND APPARATUS

George W. Pierce, Cambridge, Mass.

Application March 29, 1926, Serial No. 98,220

120 Claims. (Cl. 250—36)

The present invention relates to electrical methods, systems and apparatus, and more particularly to electromechanical vibrators, like piezo-electric crystals, and to supports and holders therefor. The present application is a continuation-in-part of a copending application Serial No. 695,094, filed February 25, 1924.

Electro-mechanical vibrators of the above-described character have the property of executing mechanical vibrations under vibratory electrical stimulus; and, conversely, of developing electrical potentials as a result of their mechanical vibrations. Piezo-electric bodies,—such as a whole crystal or part of a crystal of quartz, Rochelle salt, tourmaline, and the like,—have long been known to possess this property. Such bodies possess at least one, and usually two or more, axes—known as the electrical axes of the body—that have definite orientations in the original crystal. When a potential gradient, with a component in the direction of an electric axis, is applied to such a crystal body, the body undergoes mechanical deformations; and conversely, when the crystal body is deformed, a potential gradient is established in the body. The action of the electric forces to cause mechanical displacements of the crystal, resulting in its vibration, will be termed "stimulation"; and the development by the vibrating crystal of electromotive forces that react upon the circuit will be termed "response". The crystal body is, in general, capable of two or more particular modes of mechanical vibration, of different frequency, that correspond to two or more of its dimensions.

An object of the invention is to improve upon and simplify methods, vibrators and apparatus of the above-described character, rendering them more convenient and efficient in operation.

Other and further objects of the invention will be explained hereinafter, and will be pointed out in the appended claims, it being understood that it is intended to cover in the appended claims all the novelty that the invention may possess.

Figure 14:
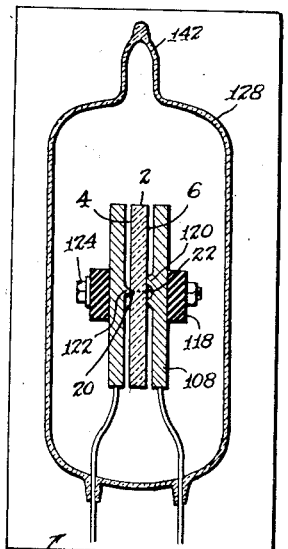

In the accompanying drawings, Fig. 1 is a perspective of apparatus constructed in accordance with the present invention, circuits being diagrammatically shown in dotted lines; Fig. 2 is a section taken upon the line 2—2 of Fig. 3, looking in the direction of the arrows; Fig. 3 is a plan of a portion of the apparatus shown in Fig. 1, upon a larger scale; Fig. 4 is a perspective similar to Fig. 1, partly broken away, of apparatus constructed according to a preferred embodiment of the present invention; Fig. 5 is a section taken upon the line 5—5 of Fig. 7, looking in the direction of the arrows; Fig. 6 is a fragmentary section upon a larger scale, taken upon the line 6—6 of Fig. 8, looking in the direction of the arrows; Fig. 7 is a plan view of a preferred mechanical-vibrator holder; Fig. 8 is another view of the apparatus shown in Fig. 4; Fig. 9 is a section of a modified form of mechanical-vibrator holder, with a preferred type of electro-mechanical vibrator mounted therein; Fig. 10 is a diagram of circuit connections corresponding to the circuits shown in Fig. 1; Figs. 11 and 12 illustrate a further modification; Fig. 13 is a further diagram of circuit connections; and Fig. 14 is a longitudinal, vertical section of a further modified crystal holder in a temperature bath.

It will conduce to an understanding of the invention to describe, first, the preferred form of electro-mechanical vibrator, which is illustrated as of the piezo-electric type. The invention is not, however, in its broader aspects, limited to such a crystal body, but may employ any body or mechanism having like properties in itself, or like properties introduced by electric currents, electric polarization, magnetic fields, etc. At 2 is shown a piezo-electric body, which has one of its electrical axes approximately along the line 20—22, in the direction of the thickness of the crystal plate. This body may be a parallelopiped in shape, as illustrated in Figs. 11, 12, and 14, or it may be a flat disc with rectangular, circular, or irregular base. In Fig. 7, the crystal is shown as of oval shape. I have found all such shapes to be operative, but for many purposes, I prefer that the piezo-electric body and its electrodes be, the one or the other, slightly curved, as shown in Fig. 9, to diminish friction or clamping between the body and its electrodes. I have hence illustrated the piezo-electric body in Figs. 9 and 10 as lenticular in shape. It may be constituted of any suitable substance having sufficiently pronounced piezo-electric properties. Quartz is preferred, because of its durability and constancy. Though the preferred shape of crystal element constitutes a feature of the present invention, it will be understood that many features, hereinafter described, are not restricted to the use of any particular substance or any particular shape or, indeed, to any particular electro-mechanical or other element. The term "electro-mechanical vibrator"—or, more simply, the term "vibrator"—will be employed hereinafter, in the specification and the claims, to denote any substance, material, or arrangement, whether or not crystalline in character, that is endowed with the above-referred-to property of changing shape or dimensions under the action of an electric force or an electric current and of reacting on the electric circuits.

The vibrator 2 is centrally located, as shown, within a box, container or housing indicated at 10 in Figs. 2, 3, 5, 7 and 9. The vertical side walls 11 of the housing 10 are there shown integral with a base plate 8 that is constituted of a conducting material, like a metal. The oppositely disposed sides or surfaces of the crystal element are indicated at 4 and 6. In the construction illustrated in Fig. 9, the sides 4 and 6 of the crystal are convex. The side or surface 4 is shown engaging the flat, bottom or base plate 8. It may contact with, or be slightly separated from, this base plate. The opposite side or surface 6 contacts with, or is near to, a second flat, conducting member 12, is disposed in the housing 10 between the crystal and an insulating cover 18. The cover 18 may be constituted of hard rubber.

Piezo-electric crystals are usually provided with opposed terminals, plates or electrodes, by means of which the crystal is adapted to be connected in an electric circuit. The base plate 8 at the bottom end of the crystal holder and the member 12 at the opposite end, serve, in accordance with a feature of the present invention, as such opposed electrodes, disposed perpendicular to the line 20—22. The side walls 11 of the crystal receptacle are shown in Figs. 2, 5, 7 and 9 as spaced from at least two sides of the crystal. The crystal is thus secured in the casing or housing 10 between the electrodes 8 and 12 without being in any way restricted, so that it is free to vibrate mechanically between the opposed electrodes 8 and 12, according to any of its modes or periods of natural vibration or any of its overtones of such modes of vibration. Among these are the longitudinal and transverse modes of vibration. Freedom from restriction is further facilitated by the fact that as the surfaces 6 and 4 are convex, the plates 8 and 12 approximate or touch the crystal at two oppositely disposed points, or small areas, indicated at 20 and 22, at a point where a node of motion is produced in the crystal body during the vibration of the crystal body, thus allowing for expansion or contraction with small friction or obstruction.

In Fig. 9, the electrode 8 is electrically connected to a binding post 14. In the holder illustrated in Figs. 4 to 8, this binding post assumes the form of a plug 15. In the apparatus of Figs. 1 to 3, the binding post 14 is not needed as contact is made directly between the base plate 8 and a flat disc conductor 13, as will presently be explained. The plate 12 is electrically connected to a binding post 16 in Figs. 1 to 3 and 9, and to a binding-post plug 17 in the remaining figures. Electrical connection is thus established between the two sides 4 and 6 of the crystal and the terminal binding posts exterior of the housing or the base plate 8, as the case may be.

In Figs. 1 to 8, the plate 12 takes the form of a metal spring member that positively and intimately contacts with the upper surface 6 of the crystal 2. The spring member is electrically connected to the binding post 16 or 17 by a screw 19. This construction renders the electrical connection of the vibrator to its binding posts resilient. The spring pressure is, of course, made very light, so as not to press so heavily upon the vibrator as to interfere with its free vibrations. The crystal is here shown flat, in order that it may contact more intimately with the base plate 8. In Fig. 9, the plate 12 may be caused to approach the vibrator 2 more or less nearly, as desired, or into pressure contact with the vibrator 2, by screwing, in one direction or the other, the binding post 16 suspended over the crystal 2. The binding post 16 may, therefore, be in the form of a thumb screw, as shown, for manually shifting the position of the conductive electrode 12 in parallel planes toward or away from the surface 6 of the crystal 2.

The binding posts 14 and 16 are simply secured to a side 11 of the receptacle or box 10, near the bottom end wall 8 in Fig. 9, and a little higher up in Figs. 4 to 8. The binding post 16 is in Figs. 1 to 3 and 9 extended outwardly from within the housing, through the insulating cover 18 at the end of the box 10 opposite to the bottom end wall 8. In Fig. 9, the binding post 16 is threaded through the cover. In Figs. 1 to 3, the binding post 16 is secured in place by a lock nut 21, as shown, which acts also to secure the spring plate 12 to the cover member 18. The screw 19 acts to lock the binding post 17 and the spring plate 12 to the cover member in Figs. 4 to 8.

The receptacle may be hermetically sealed to the atmosphere by enclosing with celluloid varnish, wax or other coating 23 so much of the parts thereof as contain cracks or other openings to the atmosphere. The cracks 25 between the side walls 11 and the cover member 18 may thus be sealed by the wax or other coating at 27. The cracks between the binding posts and the insulating members upon which they are mounted may similarly be sealed at 29. The vibrator becoming thus hermetically closed in the housing, it is protected from the action of moist gases, dust and the like. To attain great constancy of frequency, the housing may be evacuated, as described in connection with Fig. 14, so as to remove air or other gas and thus eliminate air-column resonance, which, by its variation with temperature, introduces small changes of frequency. The evacuation of the vessel, if carried to a high degree, will prevent the formation of corona which, by electronic action and heating, may produce disintegration and breaking of the crystal.

In the modification of Figs. 11, 12 and 14, there is disclosed a crystal holder more particularly adapted for use for frequency standards in which the crystal vibrates in the direction of its length. The electrode 112 is provided with an intermediately disposed projection 122 and the electrode 108 with two projections 120, disposed one on each side of the middle point. The vibrator 2, supported solely by and between the electrodes 108 and 112, is gripped or clamped by the projections 120 and 122 over or at relatively small medial areas compared to the dimensions of the vibrator, corresponding to diametrically oppositely disposed medial nodal zones of movement of the crystal, when there is small vibratory movement of the crystal, substantially along a medial electric axis when the crystal is vibrated transversely in the direction of the axis, a node of motion being produced at these relatively small nodal areas during such vibration. Damping of the crystal is thus reduced to a minimum. The electrodes 108 and 112, with the crystal disposed between them are clamped together as a unit between two insulating members 118 by bolts 124. The whole is mounted in an evacuated sealed vessel of metal or glass. A glass vessel 128 is shown in Fig. 14 the evacuation of which may be effected through an integral glass tube 142. The vessel 128 is shown kept in a constant-temperature bath.

As before stated, the holder of Figs. 1 to 3 is mechanically supported upon the flat conducting disc 13. The disc 13 is secured by a screw 31 to an insulating cover 33 of a box mounting 39. A different type of box mounting 37 is illustrated in Figs. 4 and 8. Both mountings 39 and 37 are adapted to carry the crystal holder in such manner that it may be readily detached therefrom and remounted thereon. This detachability of connection facilitates ready interchangeability of different crystals having different frequency characteristics. Provision is thus made for readily connecting different crystals into circuit and as readily disconnecting therefrom. In Figs. 4 and 8, the crystal is detachably secured to the mounting more firmly than in Fig. 1 by spring pressure, as presently to be described. In the mounting of Fig. 1, the crystal holder is merely supported upon the disc 13 by gravity. As the disc is electrically connected in circuit, as presently to be described, the mere engagement of the crystal holder therewith connects the side 4 of the crystal, through the conducting base plate 8, to one side of the circuit. The other side of the crystal is connected in circuit by a conductor 35 that connects the binding post 16 to a binding post 53 of the mounting. Of course, in the absence of the disc 13, the side 4 of the crystal could be connected in circuit by a conductor (not shown) leading from the binding post 14, Fig. 9.

The mounting of Figs. 4 to 8 is provided with sockets 43 into which the plug binding posts 15 and 17 of the crystal holder are easily guided. The sockets 43 are constituted of metal contact members which, through plugs 15 and 17, are adapted to become electrically connected with the opposite sides 4 and 6 of the crystal. It is thus possible to attach the crystal to or remove it from the mounting 37 and thus insert it into or take it out of circuit. The metal contact members are connected in circuit by conductors, as presently to be described. It is thus possible to establish a detachable connection between circuits connected with the contact sockets 43 of the mounting and the opposite sides 4 and 6 of the crystal.

In order that the crystal holder may be held resiliently upon the mounting 37, the plugs 15 and 17 are provided with longitudinally extending spring fingers 45 that are mounted over a reinforcing pin 47. These fingers 45 press outward against the inner walls of the sockets 43, as shown more particularly in Fig. 6, to hold the crystal holder firmly, yet so that it can be readily detached from the mounting. Two pairs of sockets 43 are shown, in order that the plugs 15 and 17 of the crystal holder may readily be plugged into one or the other pair, to make different circuit connections.

One or more vacuum tubes, shown diagrammatically at 24, are carried in each mounting. The vacuum tubes are each provided with three sensitive elements or electrodes, namely, a filament or cathode 26, a grid 28 and a plate or anode 30. Filament-heating batteries are diagrammatically shown at 131. A plate battery 32 is connected with the filament 26 by a conductor 133 and with the plate 30 by a conductor 135 and constitutes a source of energy for the plate 30. A plug 42 for a telephone receiver is mounted in the side of the mounting. In Fig. 10, the telephone receiver, connected across a bypass condenser 44, an ammeter 49 and a coil 40 are shown connected in the output of plate circuit interconnecting the cathode electrode 26 and the plate electrode 30. In Fig. 1, the telephone receiver is not shown. The coil 40 is connected between binding posts 57. A grid resistor is indicated diagrammatically at 46 in the input circuit interconnecting the grid electrode 28 and the cathode electrode 26.

In Figs. 1 and 10, the conducting plate 13 is shown connected by a conductor 51 and a binding post 41 with the tube plate 30. The tube plate 30 is thus electrically connected with the base plate 8. The plate 12 is similarly connected with the grid 28 by a conductor 35 that leads to the binding post 53. The described connections establish the circuit of the Pierce oscillator, the theory of the operation of which is explained in the above-described application. The invention is not, of course, restricted to use with the Pierce oscillator, this particular circuit being illustrated herein merely as one example of how the invention may be carried out. It is to be noted that the means for partially or wholly establishing the electrical circuit are contained within the mounting and that a top or side wall of the mounting is provided with means for connecting the vibrator in circuit.

A full description of the circuits of Fig. 1, as diagrammatically shown in Fig. 10, will be found in the above-identified application. The circuit connections of Figs. 4 and 13 are a little more complicated in that two pairs of sockets 43 are provided, as above stated, to change the circuit connections. By plugging into one pair or the other of the sockets, the crystal may be connected across either said cathode and grid electrodes 26 and 28, by means of the conductors 35 and 148, or across said plate and grid electrodes 30 and 28, by means of the conductors 51 and 35. The crystal may thus be caused to vibrate according to one or another mode of vibration. This will not be further described herein as it is fully explained in the above-named application.

As is also explained in the said application, I have also found that very minute variations of frequency of the order of one three-hundredths of one per cent may be introduced by bringing the electrodes more or less near to the piezo-electric vibrator. This is of importance in the final adjustment of such a vibrator, where extreme precision of frequency is required.

By means of this variable-capacity coupling between the crystal and the tuned circuit, the oscillator is thus capable of generating any wave within the limits of a predetermined band, and the period of the crystal may be increased or decreased by any desired amount so that the oscillator may sustain oscillations of any selected frequency within the predetermined band.

As shown in Fig .13, this alternating-current oscillator may have a frequency multiplier or harmonic producer coupled thereto in any desired manner. The frequency of the oscillations will thus become multiplied by a predetermined integer. By gradually varying the air gap between the electrode 12 and the surface 6 of the crystal 2 to vary the frequency of the piezo-electric device 2, corresponding changes will be effected in the multiplied or harmonic frequency within predetermined limits.

The harmonic producer or frequency multiplier may comprise any desired number of vacuum tubes.

The elements 42 and 44 of Fig. 13 are the same as in Figs. 1 and 10.

It will, of course, be understood that the invention is not restricted to the exact embodiments thereof that are illustrated and described herein, as modifications may be made by persons skilled in the art, and all such are considered to fall within the spirit and scope of the invention, as defined in the appended claims.

What is claimed is:

1. A piezo-electric-crystal holder comprising, in combination, a housing provided with a base plate, means for locating a piezo-electric crystal within said housing and contacting with said base plate, means for hermetically sealing said housing to atmosphere, and means for establishing electrical connection with the other side of said piezo-electric crystal and a point exterior of said housing.

2. In a piezo-electric-crystal apparatus, the combination of a mounting, a housing arranged to detachably engage said mounting, the housing having a conductive base member, and a piezo-electric crystal mounted in said housing with one side thereof engaging said conductive base member and the other side thereof positioned in electrical connection with a contact member.

3. A piezo-electric-crystal apparatus comprising in combination a mounting, a piezo-electric-crystal holder arranged to detachably engage said mounting, said piezo-electric-crystal holder being adapted to hold a piezo-electric crystal therein, means whereby said piezo-electric-crystal holder may be mechanically supported by said mounting, and an electrical connection established with said piezo-electric crystal.

4. In a piezo-electric-crystal apparatus, the combination of a mounting, a piezo-electric-crystal holder detachably secured to said mounting, and a piezo-electric crystal carried by said holder, said holder having terminals extending outwardly from within said holder for establishing electrical connection with said mounting when said crystal holder is engaged with said mounting.

5. A piezo-electric-crystal apparatus comprising in combination a supporting member, a piezo-electric-crystal holder carried by said supporting member, a piezo-electric crystal disposed within said holder and electrically connected with opposite ends of said holder, and means whereby said piezo-electric crystal may be electrically connected in a circuit established through contacts on said supporting member when said holder is engaged with said supporting member.

6. In a piezo-electric-crystal apparatus, the combination of a supporting mounting, a piezo-electric-crystal holder carried by said mounting and detachably engaged therewith, said holder being arranged to support a piezo-electric crystal therein, and means positioned between one face of said piezo-electric crystal and a wall of the holder for establishing electrical connection with said piezo-electric crystal, said means extending through said holder and providing a terminal on the exterior of said holder for electrically connecting said piezo-electric crystal in an electrical circuit.

7. A piezo-electric-crystal apparatus comprising in combination, a mounting adapted to receive one of a plurality of interchangeable piezo-electric-crystal holders, means for guiding said piezo-electric-crystal holder into said mounting and for establishing electrical connection with the piezo-electric crystal carried by said holder, whereby piezo-electric crystals of different frequency characteristics may be readily inserted or removed from an electrical control circuit.

8. In a piezo-electric-crystal apparatus, the combination of a mounting for piezo-electric crystals, a closure arranged to be readily attached to or removed from said mounting, a piezo-electric crystal carried within said closure, said piezo-electric crystal having its opposite sides connected to terminals, and means whereby said terminals may be electrically engaged with contacts carried by said mounting for establishing a detachable connection between circuits connected with contacts on said mounting and opposite sides of said piezo-electric crystal.

9. A piezo-electric-crystal apparatus comprising in combination a support, a plurality of piezo-electric-crystal holders each containing piezo-electric crystals of differing frequency characteristics, means interior of each of said crystal holders for supporting a piezo-electric crystal therein in a manner in which the piezo-electric crystal is free to vibrate in its own natural period, connections forming terminals on the exterior of said piezo-electric-crystal holders providing electrical connections with the opposite faces of each of said piezo-electric crystals, and contacts on said support for establishing connection with the terminals of said piezo-electric-crystal holders whereby piezo-electric crystals of different frequency characteristics may be readily interchanged on said support and connections established with the terminals thereof.

10. A piezo-electric-crystal holder comprising in combination a hermetically sealed closure and means within said closure for securing a piezo-electric crystal therein and establishing electrical connection therewith, while permitting the free vibration of said piezo-electric-crystal with substantially no restriction.

11. A receptacle for housing a piezo-electric crystal, comprising a casing, a terminal at each end of said casing, a piezo-electric crystal mounted within said casing, and connections between each of said terminals and opposite faces of said piezo-electric crystal for enabling said crystal to be connected in an electrical circuit, the walls of said receptacle being spaced from at least two sides of said piezo-electric crystal.

12. An electro-mechanical vibrator comprising a body adapted to be stimulated electrically to vibrate mechanically, the said body having oppositely disposed convex surfaces.

13. An electro-mechanical vibrator comprising a body adapted to be stimulated electrically to vibrate mechanically, the said body being of lenticular shape.

14. An electro-mechanical vibrator comprising a body adapted to be stimulated electrically to vibrate mechanically, the said body having oppositely disposed convex surfaces, and two electrodes, one adjacent to each convex surface.

15. An electro-mechanical vibrator comprising two members, namely, an electrically deformable body and an electrode, one of said members having a curvilinear surface.

16. An electro-mechanical vibrator comprising an electrically deformable body supported at a small area and provided with electrodes.

17. An electro-mechanical vibrator comprising a lenticular crystal body and electrodes.

18. An electro-mechanical vibrator comprising a piezo-electric-crystal body and electrodes, one surface of said body and one of said electrodes contacting over a small area.

19. Apparatus of the character described comprising a mounting having a contact member adapted to be connected in an electrical circuit, a holder having a contact member, an electro-mechanical vibrator carried by the holder, and means for mechanically connecting the contact members to cause the holder to be supported upon the mounting and to connect the vibrator electrically in the circuit.

20. Apparatus of the character described comprising a mounting having terminals adapted to be connected in an electrical circuit, a holder, an electro-mechanical vibrator carried by the holder, the holder having terminals with which the vibrator is electrically connected, and means for mechanically supporting the holder on the mounting and electrically connecting the holder terminals with the mounting terminals.

21. Apparatus of the character described comprising a mounting having terminals adapted to be connected in an electrical circuit, a holder, an electro-mechanical vibrator carried by the holder, the holder having terminals with which the vibrator is electrically connected, and means carried by the mounting for mechanically connecting one or more of the holder terminals to one or more of the mounting terminals and for electrically connecting the holder terminals with the mounting terminals.

22. Apparatus of the character described comprising a container having a support, means for establishing an electrical circuit carried by the container, an electro-mechanical vibrator, and means carried by the support for connecting the vibrator in the electrical circuit.

23. Apparatus of the character described comprising a container having a support, means for establishing an electrical circuit carried by the container, a holder, an electro-mechanical vibrator carried by the holder, the holder having terminals with which the vibrator is electrically connected, and means carried by the support for mechanically connecting one or more of the terminals to the support and for electrically connecting the terminals in the circuit.

24. Apparatus of the character described comprising a mounting and a holder, one of the members having a socket, and the other member having a plug, and an electro-mechanical vibrator carried by the holder, the plug being adapted to be inserted into the socket to support the holder mechanically upon the mounting and to connect the socket and the plug electrically.

25. Apparatus of the character described comprising a mounting having two contact members adapted to be connected in an electrical circuit, a holder having two contact members, an electro-mechanical vibrator carried by the holder and electrically connected with the holder contact members, two of the contact members having sockets and the other two contact members having plugs adapted to be inserted in the sockets to cause the holder to be mechanically supported by the mounting and to connect the vibrator in the electrical circuit.

26. Apparatus of the character described comprising a holder, an electro-mechanical vibrator in the holder, the holder having two plugs, one of the plugs being electrically connected with one side of the vibrator and the other plug being electrically connected with the other side of the vibrator, the plugs being adapted to be inserted in sockets.

27. Apparatus as described in claim 26 in which means is provided for resiliently holding the plugs in the sockets.

28. Apparatus as described in claim 26 in which the plugs comprise a reinforcing pin and spring fingers disposed longitudinally of the reinforcing pin, the spring fingers being adapted to engage the walls of the sockets to maintain the plugs resiliently in the sockets.

29. Apparatus of the character described comprising a holder having a conducting wall, an electrode disposed in the holder, an electro-mechanical vibrator disposed in the holder between the electrode and the wall, and means for resiliently maintaining the electrode in contact with the vibrator.

30. Apparatus as described in claim 29 in which the electrode is constituted of a resilient conducting member.

31. Apparatus as described in claim 29 in which the electrode is constituted of a spring metal member that is fastened to one of the walls of the holder.

32. Apparatus of the character described comprising a holder having a conducting wall, a conducting plate disposed in the holder, an electro-mechanical vibrator disposed in the holder between the plate and the wall, the plate being secured to a member projecting through a wall of the holder, the projecting portion of the member being adapted to be manipulated to adjust the position of the plate in the holder.

33. An electromechanical vibrator comprising an electrically deformable body and electrodes, said electrodes contacting with said vibrator only over small medial areas.

34. An electromechanical vibrator comprising an electrically deformable body and electrodes between which the body is disposed, the electrodes having means for holding the body nodally.

35. An electromechanical vibrator as defined in claim 34 in which the holding means comprises oppositely disposed projections between which the body is clamped.

36. An electro-mechanical vibrator comprising an electrode having a surface and a piezo-electric-crystal body having a surface disposed adjacent to the electrode surface, one of the surfaces being convex and the other surface being of less curvature than the curvature of the said one surface to permit the surfaces to contact over a relatively small area.

37. An electro-mechanical vibrator comprising two electrodes each having a surface, and a piezo-electric-crystal body interposed between the electrodes and having a surface adjacent to each electrode surface, one of each two adjacent surfaces being convex and the other adjacent surface being substantially plane.

38. An electro-mechanical vibrator comprising a supporting member having a supporting surface and a piezo-electric-crystal body supported by the member and having a surface disposed adjacent to and in contact with the supporting surface, one of the surfaces being convex and the other surface being of less curvature than the curvature of the said one surface to permit the surfaces to contact over a relatively small area.

39. An electro-mechanical vibrator comprising a supporting member having a supporting surface and a piezo-electric-crystal body supported by the member and having a surface adjacent to and in contact with the supporting surface, one of the surfaces being convex and the other surface being substantially plane.

40. An electro-mechanical vibrator comprising a member having a surface and a piezo-electric-crystal body having a surface adjacent to and in contact with the first-named surface, the surfaces being shaped so as to contact over a relatively small area.

41. An electro-mechanical vibrator comprising a housing having a supporting member provided with a supporting surface and a piezo-electric-crystal body in the housing supported by the member and having a surface adjacent to and in contact with the supporting surface, the surfaces being shaped so as to contact over a relatively small area.

42. An electro-mechanical vibrator comprising a housing having a supporting member provided with a supporting surface and a piezo-electric-crystal body in the housing supported by the member and having a surface adjacent to and in contact with the supporting surface, the surfaces being shaped so as to contact over a relatively small area at a point where a node of motion is produced in the crystal body during the vibration of the crystal body.

43. Piezo-electric-crystal apparatus comprising a housing for receiving a piezo-electric-crystal element and an adjustable electrode carried by said housing for establishing an electrostatic connection with the surface of said piezo-electric-crystal element for varying the vibratory period of the piezo-electric-crystal element.

44. Piezo-electric-crystal apparatus comprising two electrodes, a piezo-electric crystal disposed between the electrodes, and means for varying the space relationship of the electrodes to the piezo-electric crystal so as to vary the frequency of the vibratory period of the piezo-electric crystal.

45. Piezo-electric-crystal apparatus comprising a piezo-electric crystal and conducting plates therefor, and means for varying the air-gap or distance between said crystal and one of its conducting plates to vary the frequency of vibration of said crystal.

46. A system according to claim 45 comprising means for generating oscillations, and means connecting said crystal with the generating means to control the frequency of the generated oscillations.

47. A system according to claim 45 comprising a thermionic valve for the generation of oscillations, and means connecting said crystal with said valve for controlling the frequency of the generated oscillations.

48. An electric oscillation generator comprising a piezo-electric crystal, two electrodes between which the crystal is disposed, and means for smoothly and continuously varying the space relationship of the electrodes to the crystal so as to vary the frequency of the electrical oscillations generated.

49. A piezo-electric crystal mounted so that it is clamped only at parts of its surface which are substantially nodal zones, thus preventing any movement other than the desired vibration.

50. A piezo-electric crystal arranged for longitudinal or transverse vibration, the electrodes being spaced slightly apart from opposite faces of the crystal, and gripping means being jammed between the electrodes and the faces of the crystal near the middle of the length of the crystal or other nodal zones.

51. Piezo-electric-crystal apparatus comprising a housing having a conductive base member, a piezo-electric-crystal element positioned upon said base member for electrically connecting the lower surface of said piezo-electric-crystal element, an adjustable electrode positioned in said housing over the upper surface of said piezoelectric-crystal element, and means operating to advance or retard said electrode with respect to the upper surface of said piezo-electric-crystal element to vary the frequency of the vibratory period of the piezo-electric-crystal element.

52. A piezo-electric-crystal apparatus comprising in combination a stationary electrode in contact with a piezo-electric-crystal element, and a movable electrode in contact with said piezo-electric-crystal element, and restricted to move toward and from the piezo-electric-crystal element to vary the frequency of the vibratory period of the piezo-electric-crystal element.

53. A piezo-electric-crystal apparatus comprising, in combination, a piezo-electric-crystal element, a conductive plate for supporting the piezo-electric-crystal element, a conductive plate for establishing electrical connection with the upper surface of said piezo-electric-crystal element, and means for maintaining said second-named plate and piezo-electric-crystal element in position relative to each other and said conductive plate.

54. A piezo-electric-crystal holder comprising in combination a housing having a metallic plate member at one end thereof, a piezo-electric-crystal element supported on said metallic plate member, a contact plate for establishing electrical connection with the upper surface of said piezo-electric-crystal element, means for maintaining said crystal element and contact plate in operative position, and terminals connected to said metallic plate member and contact plate.

55. An electro-mechanical vibrator comprising a piezo-electric crystal and two electrodes, and means for adjusting the relative positions of the crystal and the electrodes for varying the vibratory period of the piezo-electric crystal.

56. An electro-mechanical vibrator comprising a piezo-electric crystal and two electrodes, and means for adjusting one of the electrodes to and from the crystal for varying the vibratory period of the piezo-electric crystal.

57. An electro-mechanical vibrator comprising a piezo-electric crystal and two electrodes, a member connected with one of the electrodes, and means for adjusting the member to adjust the position of the said one electrode relative to the crystal for varying the vibratory period of the piezo-electric crystal.

58. An electro-mechanical vibrator comprising a piezo-electric crystal and two electrodes, a screw-threaded member connected with one of the electrodes, and a member in which the screw-threaded member is threaded and in which it may be threaded back and forth to adjust the position of the said one electrode relative to the crystal for varying the vibratory period of the piezo-electric crystal.

59. The combination of an oscillator capable of generating any wave within the limits of a predetermined band, a piezo-electric device associated with said oscillator and disposed between a pair of electrodes, and means for varying the spacing between one of the electrodes and an adjacent face of the crystal to increase or decrease the period of said piezo-electric device by any desired amount so that the oscillator may sustain oscillations of any selected frequency within the predetermined band.

60. The combination of a vacuum tube system having a piezo-electric element associated therewith and disposed between a pair of electrodes, and screw-threaded means for varying the spacing between one of the electrodes and an adjacent face of the crystal to vary vibratory period of the piezo-electric element.

61. The combination of a vacuum tube system, a piezo-electric element placed between a pair of electrodes and associated with the vacuum tube system, and a screw-threaded member to vary the spacing of said electrodes for varying the vibratory period of the piezo-electric element.

62. The combination of an oscillating circuit, a piezo-electric element included between a pair of electrodes and associated with the oscillating circuit, and means including a thumb screw for varying the spacing of said electrodes by any desired amount for varying the vibratory period of the piezo-electric element.

63. Piezo-electric-crystal apparatus comprising in combination with an electron tube oscillator, a piezo-electric crystal for sustaining oscillations generated by said oscillator, a pair of conductive electrodes connected with said oscillator and disposed on opposite sides of said crystal and a manually controllable device for shifting the frequency of said piezo electric crystal oscillator by a shift in the position of one of said conductive electrodes with respect to the surface of said crystal adjacent to said one electrode.

64. Piezo-electric-crystal apparatus comprising in combination an electron tube having grid, cathode and plate electrodes, an input circuit interconnecting said grid and cathode electrodes, an output circuit interconnecting said cathode and plate electrodes, a piezo-electric crystal, a pair of conductive plate members for supporting said piezo-electric crystal, and manually adjustable means for controlling the distance between one of said conducting plate members and a surface of said piezo-electric crystal adjacent to said one conducting plate member, whereby the frequency at which said piezo-electric crystal sustains oscillations in said electron tube circuit may be varied at will.

65. Piezo-electric-crystal apparatus comprising in combination an electron tube having grid, cathode and plate electrodes, an input circuit interconnecting said grid and cathode electrodes, an output circuit interconnecting said cathode and plate electrodes, a piezo-electric crystal, a pair of plate members for supporting said piezo-electric crystal and connecting said crystal with said electron tube circuit and manually adjustable means comprising a screw arrangement suspended over the said crystal for varying the spacial relationship between the plate member adjacent to said screw arrangement and one surface of said piezo-electric crystal in parallel planes toward or away from the surface of said crystal for shifting the frequency at which said piezo-electric crystal sustains oscillations in said electron tube circuits.

66. The combination of a vacuum tube system, a piezo-electric element placed between a pair of electrodes and associated with the vacuum tube system to control the frequency therein, and means including a screw threaded member to selectively vary the frequency in said system by varying the spacing between one of the electrodes and an adjacent face of the crystal.

67. The combination of a piezo-electric crystal, two conductive plates between which the piezoelectric crystal is placed so that it may freely vibrate therebetween, and means for changing to a desired value the period of vibration of said crystal between said plates, including means for manually adjusting the position of one of said electrodes in relation to the corresponding surface of the crystal.

68. The method for adjusting the frequency of a piezo-electrically-controlled oscillator having a piezo-electric element disposed between electrodes, which includes the steps of setting up oscillations in said oscillator of approximately the desired frequency and varying the distance between one of said electrodes and the piezo-electric element to obtain the desired frequency.

69. The method for adjusting the frequency of an oscillator, the frequency of which is controlled by a piezo-electric crystal disposed between electrodes, which includes the step of varying the gap between a surface of the crystal and the electrode associated with said surface, until the desired frequency is obtained.

70. Means for selectively controlling the frequency of an electric circuit within a limited band of frequencies including a piezo-electric device and means including a variable capacity for selectively changing to a desired value the frequency of vibration of said piezo-electric device in said circuit.

71. The method of varying the frequency at which a piezo-electric crystal coupled to a tuned circuit will exhibit maximum potential effects, which includes the step of capacitively varying the coupling between the crystal and circuit.

72. The method for adjusting the frequency of a piezo-electrically-controlled oscillator having a piezo-electric element disposed between electrodes in a control circuit, which includes the steps of setting up oscillations in said oscillator of approximately the desired frequency and varying the value of series capacity in the control circuit to obtain the desired frequency.

73. A receptacle for housing a piezo-electric crystal comprising a support, a housing secured to said support, electric terminals extending into said housing, means for supporting a piezo-electric crystal within said housing, and means for establishing electrical connection between each of said terminals and the opposite faces of said piezo-electric crystal with a point exterior to the said housing for enabling said crystal to be connected in an electric circuit to allow vibration thereof.

74. A piezo-electric oscillator including a hermetically sealed vessel, electrodes within said vessel, a piezo-electric crystal interposed between said electrodes, means within said vessel for holding said electrodes in spaced relation, and terminals on the exterior of said vessel which are in electrical communication respectively to said electrodes through the vessel.

75. Piezo-electric-crystal apparatus comprising in combination with an electron tube having grid, cathode and plate electrodes, an input circuit interconnecting said grid and cathode electrodes, an output circuit interconnecting said plate and cathode electrodes, a piezo-electric crystal connected in series with said grid electrode, a conductive plate member for electrically connecting said piezo-electric crystal across either said cathode and grid electrodes or said plate and grid electrodes, and means for variably relating said conductive plate with one surface of said piezo-electric crystal for shifting the frequency of said electron tube system.

76. Piezo-electric-crystal apparatus comprising in combination a piezo-electric plate, a metallic supporting member for establishing electrical connection with one face of said plate, and an electrically conductive plate member mounted for variable movement toward and away from the opposite face of said plate for varying the vibratory period of the piezo-electric plate.

77. Piezo-electric-crystal apparatus comprising in combination a piezo-electric plate, means for establishing electrical connection with one face of said piezo-electric plate, and means arranged to be capacitively related with the other face of said piezo-electric plate and variable in spacial relation with respect thereto for establishing electrical connection with said last-mentioned face of said piezo-electric plate for varying the vibratory period of the piezo-electric plate.

78. Piezo-electric-crystal apparatus comprising in combination a piezo-electric plate, means positioned in intimate contact with one side of said plate for establishing electrical connection therewith, and means arranged to be variably positioned in spacial relationship with respect to the opposite face of said plate for establishing electrical connection therewith for varying the vibratory period of the piezo-electric plate.

79. Piezo-electric-crystal apparatus comprising in combination a piezo-electric plate, a pair of flat conductive members for establishing electrical connection with opposite faces of said piezoelectric plate, and means for varying the spacial relationship between one of said members and said piezo-electric plate for varying the vibratory period of the piezo-electric plate.

80. Piezo-electric-crystal apparatus comprising in combination a piezo-electric plate, an electrically conductive member lying in intimate contact with one face of said plate, and an independent electrically conductive member arranged to be moved in variable parallel planes with respect to the opposite face of said piezoelectric plate for selecting the frequency of operation of said piezo electric plate.

81. Piezo-electric-crystal apparatus comprising in combination a piezo-electric plate, an electrically conductive member lying in intimate contact with one face of said plate, and an independent electrically conductive member arranged to be moved in variable parallel planes with respect to the opposite face of said piezo-electric plate, to a position in positive intimate contact with said piezo-electric plate for selecting the frequency which will be sustained by said piezoelectric plate.

82. Piezo-electric crystal apparatus comprising in combination an electron tube oscillator, a piezo-electric crystal disposed between a pair of conductive plates and arranged in circuit with said oscillator for sustaining the frequency generated thereby, means for varying the spacial relation between one of said plates and the surface of said piezo-electric crystal, and means for moving one of said plates toward or away from said crystal while maintaining the said plate parallel with the surface of said crystal for shifting the frequency of said crystal independently of the frequency of said electron tube oscillator.

83. Piezo-electric-crystal apparatus comprising in combination a piezo-electric plate, a metallic supporting member for establishing electrical connection with one face of said plate, and an electrically conductive plate member mounted for variable movement toward and away from the opposite face of said plate for varying the vibratory period of the piezo-electric plate.

84. Piezo-electric-crystal apparatus comprising in combination a piezo-electric plate, means for establishing electrical connection with one face of said piezo-electric plate, and means arranged to be capacitively related with the other face of said piezo-electric plate and variable in spacial relation with respect thereto for establishing electrical connection with said last mentioned face of said piezo-electric plate for varying the vibratory period of the piezo-electric plate.

85. Piezo-electric-crystal apparatus comprising in combination a piezo-electric plate, means positioned in intimate contact with one side of said plate for establishing electrical connection therewith, and means arranged to be variably positioned in spacial relationship with respect to the opposite face of said plate for establishing electrical connection therewith for varying the vibratory period of the piezo-electric plate.

86. Piezo-electric-crystal apparatus comprising in combination a piezo-electric plate, a pair of flat conductive members for establishing electrical connection with opposite faces of said piezoelectric plate, and means for varying the spacial relationship between one of said members and said piezo-electric plate for varying the vibratory period of the piezo-electric plate.

87. Piezo-electric-crystal apparatus comprising in combination a piezo-electric plate, an electrically conductive member lying in intimate contact with one face of said plate, and an independent electrically conductive member arranged to be moved in variable parallel planes with respect to the opposite face of said piezo-electric plate for selecting the frequency of operation of said piezo-electric plate.

88. Piezo-electric-crystal apparatus comprising in combination a piezo-electric plate, an electrically conductive member lying in intimate contact with one face of said plate, and an independent electrically conductive member arranged to be moved in variable parallel planes with respect to the opposite face of said piezo-electric plate, to a position in positive intimate contact with said piezo-electric plate for selecting the frequency which will be sustained by said piezoelectric plate.

89. An electromechanical vibrator comprising a freely vibratory, quartz-crystal body, the vibratory portions of the body being substantially unrestricted so as to permit free vibration of the body, and means for holding the body against bodily movement in any direction out of a predetermined position.

90. An electromechanical vibrator comprising a freely vibratory, quartz-crystal body, the vibratory portions of the body being substantially unrestricted so as to permit free vibration of the body, and two oppositely disposed holding members securely engaging the body and between which the body is held against bodily movement out of a predetermined position.

91. An electromechanical vibrator comprising a freely vibratory, piezo-electric-crystal body, and two oppositely disposed holding members having portions of relatively small area between which the body is nodally clamped and solely supported.

92. An electromechanical vibrator comprising a piezo-electric-crystal body, electrodes, and means for holding the body nodally between the electrodes against bodily movement out of a predetermined position.

93. An electromechanical vibrator comprising a freely vibratory quartz-crystal body, the vibratory portions of the body being substantially unrestricted so as to permit free vibration of the body, electrodes, and means for securely holding the body between the electrodes at points along the electric axes of the body to prevent bodily movement of the body out of a predetermined position.

94. An electromechanical vibrator comprising a freely vibratory quartz-crystal body, the vibratory portions of the body being substantially unrestricted so as to permit free vibration of the body, electrodes, and means for holding the body between the electrodes at points along the electric axis of the body to prevent bodily movement of the body out of a predetermined position and for adjusting one of the electrodes.

95. An electromechanical vibrator comprising a piezo-electric-crystal body, electrodes, and two oppositely disposed holding members having portions of relatively small area engaging the body at two opposite points along the electric axis of the body to prevent bodily movement of the body out of a predetermined position.

96. An electromechanical vibrator comprising a piezo-electric-crystal body, electrodes, and means for securely holding the body spaced from and between the electrodes against bodily movement out of a predetermined position.

97. An electric system having, in combination, an electric circuit, a freely vibratory quartz-crystal body connected with the circuit for maintaining the frequency of the circuit substantially constant, the vibratory portions of the body being substantially unrestricted so as to permit free vibration of the body, and means for holding the body against bodily movement out of a predetermined position.

98. An electric system having, in combination, an electric circuit, a freely vibratory quartz-crystal body connected with the circuit for maintaining the frequency of the circuit substantially constant, the vibratory portions of the body being substantially unrestricted so as to permit free vibration of the body, and two oppositely disposed holding members between which the body is held against bodily movement out of a predetermined position.

99. An electromechanical vibrator comprising a piezo-electric-crystal body, electrodes, and means for holding the body nodally between the electrodes at points along the electric axis of the body to prevent bodily movement of the body out of a predetermined position.

100. In a piezo-electric-crystal-controlled oscillation generator, a freely vibratory quartz-crystal body, the vibratory portions of the body being substantially unrestricted so as to permit free vibration of the body, and mechanical means for varying the frequency at which the crystal body tends to oscillate.

101. In a radio transmitting system, an oscillation generator comprising a thermionic tube and associated circuits, means comprising a freely vibratory quartz-crystal body for determining the oscillation frequency, the vibratory portions of the body being substantially unrestricted so as to permit free vibration of the body, and a movable element for varying the frequency at which the crystal body oscillates.

102. An electromechanical vibrator comprising a freely vibratory, piezo-electric-crystal body, and means for holding the body nodally.

103. An electromechanical vibrator comprising a freely vibratory, piezo-electric-crystal body, and two oppositely disposed holding members between which the body is held nodally against bodily movement out of a predetermined position.

104. An electromechanical vibrator comprising a piezo-electric-crystal body, electrodes, and means for holding the body nodally spaced from and between the electrodes against bodily movement out of a predetermined position.

105. An electric system having, in combination, an electric circuit, a freely vibratory body connected with the circuit for maintaining the frequency of the circuit substantially constant, and means for holding the body nodally against bodily movement out of a predetermined position.

106. An electric system having, in combination, an electric circuit, a freely vibratory body connected with the circuit for maintaining the frequency of the circuit substantially constant, and two oppositely disposed holding members between which the body is held nodally against bodily movement out of a predetermined position.

107. An oscillatory system having, in combination, a hermetically sealed container having therein a cathode and a plurality of cold electrodes, circuits connecting said cold electrodes with said cathode, a freely vibratory piezo-electric-crystal body provided with electrodes, means connecting the crystal body in the system, the parameters of the system having electrical characteristics such as to render the system oscillatory under the control of the crystal body at a substantially constant frequency determined by a mode of vibration of the crystal body, and such as to render the system stably non-oscillatory when not under the control of the crystal body, and mechanical means for varying the space between the crystal body and one of the electrodes to vary the frequency at which the crystal body oscillates.

108. A piezo-electric crystal, a plurality of electrodes for said crystal and means for adjusting the frequency or period of vibration of said crystal to a desired value, said means including means for varying the pressure and the air gap between said crystal and at least one of said electrodes.

109. Piezo-electric-crystal apparatus comprising lower and upper crystal electrodes having oppositely disposed substantially horizontal substantially flat surfaces, and a piezo-electric crystal substantially horizontally resting on the lower electrode and having an upper face adjacent to the substantially flat lower surface of the upper electrode, the crystal having an electric axis substantially perpendicular to the said substantially flat faces of the crystal.

110. An electromechanical vibrator comprising a substantially freely vibratory piezo-electric-crystal body, electrodes, and two oppositely disposed holding members having portions of relatively small area between which the body is nodally clamped and thereby securely supported between the electrodes at points along the electric axis of the body to prevent bodily movement of the body yet nevertheless to permit substantially free vibrations of the body.

111. A holder for a vibrating body comprising a pair of oppositely disposed projections between which the vibrating body is clamped at a nodal zone, and means for adjusting the pressure of said projections against the vibrating body, whereby any movement of the body other than the desired vibration is effectively prevented.

112. A holder for a vibrating piezo-electric crystal comprising a pair of oppositely disposed projections between which the crystal is clamped at a nodal zone, and means for adjusting the pressure of said projections against the crystal.

113. A holder for a piezo-electric crystal comprising a pair of oppositely disposed supports between which the crystal is clamped at a nodal point, and means for adjusting the pressure of said supports against the crystal.

114. A holder for a vibrating body comprising a pair of oppositely disposed supports between which the vibrating body is clamped, said supports being so narrow in width that the frequency of vibration of said vibrating body is not materially changed by a change in the pressure of said supports against said vibrating body.

115. A holder for a vibrating piezo-electric crystal comprising a pair of oppositely disposed projections between which the crystal is clamped at a nodal point, said projections being so narrow in width that the frequency of vibration of said crystal is substantially unaffected by a change in the pressure of said projections against said crystal.

116. An electromechanical vibrator comprising a substantially freely vibratory piezo-electric-crystal body, electrodes, and means for holding the body nodally between the electrodes at points along the electric axis of the body to prevent bodily movement of the body out of a predetermined position yet nevertheless to permit substantially free vibrations of the body.

117. An electromechanical vibrator comprising a substantially freely vibratory piezo-electric-crystal body, electrodes, and means contacting the crystal body at two regions of relatively small area for securely supporting the body between the electrodes.

118. An electromechanical vibrator comprising a substantially freely vibratory piezo-electric-crystal body, electrodes, and means contacting the crystal body at two points for securely supporting the body between the electrodes.

119. An electromechanical vibrator comprising a piezo-electric-crystal body in the form of a bar the length of which is large compared with its other dimensions and that is freely vibratory according to a natural mode of vibration in the direction of its length, two oppositely disposed supports provided with clamping members having portions of relatively small area the dimensions of which are small compared with the length and the width of the bar, and means for causing the clamping members to clamp small nodal portions of the body between the two portions of relatively small area to hold the body nodally clamped and solely supported between the said two portions of relatively small area.

120. An electromechanical vibrator comprising a piezo-electric-crystal body having electrodes at opposite faces thereof substantially at right angles to the electric axis of the body, the body being in the form of a bar the length of which is large compared with its other dimensions and having a centrally disposed nodal region with respect to which it is freely vibratory according to a natural mode of vibration in the direction of its length, two oppositely disposed supports provided with clamping members having portions of relatively small area the dimensions of which are small compared with the length and width of the bar, and means for adjusting one of the clamping members to cause the clamping members to clamp between the two portions of relatively small area small nodal portions of the body at opposite sides of the nodal region to hold the body nodally clamped and solely supported between the said two portions of relatively small area.

GEORGE W. PIERCE.